United States Patent [19]

Brain et al.

[11] Patent Number: 5,260,083
[45] Date of Patent: Nov. 9, 1993

[54] FRUIT SPREAD AND METHOD OF PREPARING SAME

[75] Inventors: Charles H. Brain, Wooster; Karen S. Gaither; David J. Muenz, both of Akron, all of Ohio

[73] Assignee: The J. M. Smucker Company, Orrville, Ohio

[21] Appl. No.: 857,254

[22] Filed: Mar. 25, 1992

[51] Int. Cl.$^5$ .............................................. A23L 1/06
[52] U.S. Cl. ................................. 426/573; 426/577; 426/578; 426/639; 426/804
[58] Field of Search ............... 426/573, 577, 575, 578, 426/804, 639

[56] References Cited

U.S. PATENT DOCUMENTS

| | | |
|---|---|---|
| 3,947,604 | 3/1976 | McGinley et al. .................. 426/573 |
| 4,830,787 | 5/1989 | Klemann et al. .................. 260/410 |
| 4,915,974 | 4/1990 | D'Amelia et al. .................. 426/611 |
| 4,957,764 | 9/1990 | Okonogi et al. .................. 426/573 |
| 4,985,270 | 1/1991 | Singer et al. .................. 426/515 |
| 4,988,527 | 1/1991 | Buckholz, Jr. et al. ........... 426/536 |
| 5,000,974 | 3/1991 | Albersmann .................... 426/572 |
| 5,011,701 | 4/1991 | Baer et al. .................... 426/573 |
| 5,019,414 | 5/1991 | Valdes ........................ 426/573 |
| 5,034,242 | 7/1991 | Lasdon et al. .................. 426/632 |
| 5,063,075 | 11/1991 | Yarger et al. .................. 426/601 |
| 5,064,678 | 11/1991 | Klemann et al. ................. 426/611 |

*Primary Examiner*—Jeanette Hunter
*Attorney, Agent, or Firm*—Body, Vickers & Daniels

[57] ABSTRACT

An edible fruit spread in a form similar to a jelly or jam having improved texture and flavor characteristics and a decreased dissipation rate in the mouth during consumption is prepared by incorporating a pectin, starch, cellulose, carrageenan or protein based fat mimetic into a fruit spread recipe.

16 Claims, No Drawings

FRUIT SPREAD AND METHOD OF PREPARING SAME

BACKGROUND OF THE INVENTION

This invention relates to the art of foods and, more particularly, to fruit spreads in a form similar to jellies and jams having improved texture and flavor characteristics and a decreased dissipation rate in the mouth during consumption in comparison with standard fruit spread products.

It is of course well known that standard jelly and jams are produced by blending a fruit ingredient, sweetener and water, preparing a stabilizer solution, such as pectin, and adding the latter to the blend to form a mixture thereof, and then cooking the mixture to a desired soluble solids content, and hot filling the cooked mixture into suitable receptacles such as jars. Such a recipe may include, for example, about 10% by weight of a fruit juice concentrate, about 57% by weight of the sweetener such as sugar, pectin in the amount of about 0.4% by weight and water in the amount of about 32.6% by weight. A suitable soluble solids content for the cooked jelly may, for example, be about 65%. The texture of a standard jelly is of course that of a gel which may be a soft or tough gel but, in any event, is somewhat solid. This texture makes it difficult to spread evenly and provides a mouthfeel during consumption in which the solidity of the jelly is noticeable to the consumer.

As is well known, fat mimetics, are edible materials used as fat replacements in foods to reduce the calories in the foods without decreasing the palatability and flavor of the food. Fat mimetics are materials which are inherently of lower caloric value than the fats they replace. Therefore, the calorie intake in a food containing a fat mimetic as a replacement for fat is reduced relative to the same food with fat. At the same time, the fat mimetic retains the desirable physical and organoleptic characteristics of fat in the food to which it is added.

A number of fat mimetics for the latter purpose and/or food products containing fat substitutes or replacements are disclosed, for example, in U.S. Pat. Nos. 4,830,787 to Klemann et al; 4,915,974 to D'Amelia et al; 4,985,270 to Singer et al; 5,011,701 to Baer et al; 5,063,075 to Yarger et al; and, 5,064,678 to Klemann et al, the disclosures of which are incorporated herein by reference. These patents disclose a variety of materials and compositions useful in foods such as pie fillings, frozen dairy products, salad dressings, icings and the like to reduce the fat content of the food product while maintaining the physical and organoleptic characteristics of the food product which would be attained if the food were prepared with fat. In all of these patents, the fat mimetic is a substitute or replacement for fat in a food which normally contains fat. In addition to the foregoing patents, U.S. Pat. No. 4,988,527 to Buckholz et al discloses the use of sclareolide for enhancing the organoleptic properties of food stuff whereby, for example, the sweetness of a jelly resulting from the use of a non-nutritive sweetener such as aspartame is enhanced by mixing sclareolide with the non-nutritive sweetener, and U.S. Pat. No. 3,947,604 to McGinley et al discloses an edible jelly having improved spreadability and resistance to heat at baking temperatures by incorporating in the jelly recipe a small amount of a composition of beta-1, 4 glucan and sodium carboxymethyl cellulose. Neither sclareolide nor the composition disclosed in the patent to McGinley has the characteristics of a fat mimetic, namely the ability to mimic the smooth and creamy mouthfeel, texture and lubricity of fat, when incorporated into a fruit spread product.

SUMMARY OF THE INVENTION

Fruit spreads are non-fat foods, but we have discovered that the incorporation of fat mimetics into the recipes for fruit spreads, as an additional ingredient rather than a fat substitute, provides a new fruit spread product having an improved texture which is creamy and thus has improved spreadability relative to standard jellies and jams. Furthermore, fat mimetics incorporated into fruit spread recipes enhance the flavor and mouthfeel thereof which, we believe, results from a decreased dissipation rate for the spread in the mouth during consumption which, in turn, is due to the presence of the fat mimetic ingredient. The fruit spread product according to our invention is not a fat imitation product but, rather, similar to a traditional jelly or jam product with new and unique characteristics.

More particularly in accordance with the invention, it has been found that fruit spread recipes incorporating a fat mimetic selected from the group consisting of pectin, starch, cellulose, carrageenan and protein based fat mimetics, in appropriate amounts and introduced at the appropriate time in the preparation process, enable producing a new fruit spread having the improved texture and flavor characteristics referred to above. With respect to fruit spreads made with the foregoing fat mimetic ingredients, the cooking time is dependent on the desired soluble solids content for the end product, which preferably is between from 20% to 70% by weight, the cooking temperature is the same as that for standard jellies and jams, and the cooked mixture is hot filled into final containers, such as jars. With respect to the cooking temperature, cooking in the examples set forth hereinafter is in a vacuum kettle at about 160° F. which is standard with respect to high volume production. If cooking is achieved in an open vessel, the standard cooking temperature would be about 220° F. As with standard jellies and jams, a food acid can be added following cooking to adjust the pH, and optional ingredients such as dairy solids, stabilizers, flavors, bulking agents, and preservatives can be added before or after cooking, depending on the individual ingredient characteristics and requirements.

In accordance with one aspect of the invention, the preparation of fruit spreads incorporating either a pectin based fat mimetic or a starch based fat mimetic includes homogenization of the ingredients under high shear following cooking to microparticulate the product into a particle size of from about 5 to 100 microns and/or to form a particle gel with a particle aggregate size of from about 2 to 15 microns after which the mixture is hot filled into suitable containers.

The following examples are presented to further illustrate and explain the invention and should not be taken as limiting in any regard. Unless stated otherwise, all percentages are by weight and are based on the weights of the ingredients in the formulations after cooking to a desired soluble solids content for the final product.

EXAMPLE I

In a preferred embodiment of the invention, a fruit spread is prepared using a pectin based fat mimetic and in particular a fat mimetic marketed by Hercules, Inc. under the trade name Slendid. The pectin in Slendid is a low methoxyl pectin. This fat mimetic is a powder which, in connection with its intended use as a fat substitute is mixed with water and calcium chloride and is homogenized under high shear to make a solution having a creamy consistency which is then added to a food normally containing fat as a replacement for the fat. The calcium chloride reacts with the Slendid to form a gel and the homogenization produces the fat mimicking characteristics.

In preparing a fruit spread using the above pectin based fat mimetic, a characterizing fruit ingredient such as whole fruit, fruit puree or fruit juice in an amount from 0 to 55% is blended under low shear with a sweetener such as sugar, corn syrup, or fruit juice concentrate in an amount depending on the desired soluble solids content for the end product within the range of 20% to 70%, and with water from 0 to 80%. Slendid, in the amount of from 0.5% to 3%, is mixed with water under high shear to provide a Slendid solution which is then added to the blend. Blending after the addition of the Slendid solution at low shear provides a homogeneous mixture of all the ingredients. The formula requires calcium ion in an amount less than 1% and this amount may be present in the fruit used for the flavoring. If it is not, the necessary amount of calcium chloride is added to the blend just before the Slendid solution. Following the addition of the Slendid solution, the mixture is deaerated and cooked in a vacuum kettle at about 160° F. to the desired soluble solids content. After cooking, citric acid or malic acid in an amount less than 1.0% is added to adjust the pH, and the final mixture is then homogenized under high shear at about 2500 psi to microparticulate the mixture to a particle size of from about 5 to 100 microns. The particulated mixture is then hot filled into suitable containers such as jars.

In connection with attaining the fat mimetic function of the pectin based fat mimetic in the fruit spread product, it is important to homogenize the final mixture into microparticulate form prior to hot filling into the final containers. Therefore, upon the addition of the Slendid solution to the initial blend, it is necessary to have the mixture gel during the cooking process. The calcium ion is in the formulation as a gel promoter to promote this gelling and, as mentioned above, is either in the fruit or is added to the formulation. Achieving a gel during processing is contrary to the preparation of standard jellies, jams and preserves wherein it is important to delay product gelling until the latter is in its final container. Furthermore, homogenizing of the product prior to depositing the latter in its final container is also contrary to the preparation of regular jellies, jams and preserves which do not require homogenization.

Homogenization of the cooked mixture under high shear into microparticulate form in the preparation of a fruit spread using the pectin based fat mimetic is necessary in order to attain the functionality of the mimetic and thus the physical and organoleptic characteristics which provide the texture and flavor improvements according to the present invention. The microparticulate structure resulting from the homogenizing process is permanent with respect to both time and normally encountered storage and use temperatures for the product.

In this example, dairy solids from 0% to 2%, stabilizers such as pectin, carrageenan, alginate, gellan gum, or other suitable hydrocolloids from 0% to 2%, artificial flavoring from 0% to 5%, bulking agents such as cellulose, maltodextrin or polydextrose from 0% to 10%, and/or a preservative from 0% to 0.1% can be added as an optional ingredient or ingredients before or after cooking but prior to homogenizing.

An actual formula which provides the improved texture and flavor for a jelly like fruit spread, using a pectin based fat mimetic, prepared as set forth above, comprises 119 pounds of a juice concentrate, 562 pounds of sugar, 488 pounds of water, 24 pounds of Slendid and 7 pounds of citric acid. These ingredients are processed as described above to provide a soluble solids content of 55% for the finished product and a theoretical yield of 1200 pounds of product. This formula presumes that the necessary calcium ions are in the juice concentrate. If they are not, up to 2 pounds of calcium chloride would be added where indicated in the process described above.

The final product produced in accordance with the foregoing example is a fruit spread having a creamy texture which facilitates the spreading thereof and which provides a good mouthfeel and a decreased dissipation rate in the mouth during consumption and thus an enhanced flavor relative to traditional fruit spread products.

EXAMPLE II

A fruit spread having improved texture and flavor characteristics according to the invention is prepared using a starch based fat mimetic and in particular a product marketed by Staley Manufacturing Company under the trade name Stellar which is a modified corn starch fat mimetic. In making a fruit spread using this starch based fat mimetic, 0% to 55% of a whole fruit, fruit puree, or fruit juice is blended with 10% to 75% of a sweetener, such as sugar, corn syrup, or fruit juice concentrate, 0% to 80% of water, and 5% to 20% of Stellar at a low shear. The blend is heated to about 160° F., and 0% to 2% of a stabilizer such as pectin, carrageenan, alginate, gellan gum or other suitable hydrocolloid is mixed with water to provide a solution which is then added to the blend. This mixture is then cooked in a vacuum kettle at a temperature of about 160° F. to a desired soluble solid content between about 20% to 70%. Upon reaching the desired soluble solids content, the mixture is homogenized under a high shear at about 8000 psi to produce a particle gel with a particle aggregate size of from about 2 to 15 microns following which the product is hot filled into its final containers. If desired, 0.1% by weight of potassium sorbate can be added as a preservative after cooking, and 0% to 10% of a bulking agent such as cellulose, maltrodextrin or polydextrose, and 0% to 2% dairy solids can be added to the blend prior to the initial heating.

A preferred formula which provides the improved texture and flavor for a fruit spread, using a starch based fat mimetic, prepared as set forth above, comprises 35% fruit, fruit puree or fruit juice, 48% of a sweetener, 6.5% water, 0.5% pectin and 10% Stellar.

The final product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

EXAMPLE III

A fruit spread having improved texture and flavor in accordance with the invention is prepared using a cellulose based fat mimetic and in particular microcrystalline cellulose. A fruit spread using this fat mimetic is prepared by blending, at low shear, 0% to 55% of a characterizing fruit ingredient of whole fruit, fruit puree or fruit juice with 10% to 75% of a sweetener, such as sugar, corn syrup, or fruit juice concentrate, and 0% to 80% of water. 0.05% to 0.5% of microcrystalline cellulose is prepared in a water solution with 0.1% to 1.0% of a stabilizer which is either pectin, or locust bean gum or xanthan gum, and this solution is added to the flavor and sweetener blend. The mixture is then cooked in a vacuum kettle at a temperature of about 160° F. to a desired soluble solids content between about 20% to 70%. After cooking, 0% to 1.0% citric acid or malic acid is added to adjust the pH, and the mixture is hot filled in its final containers wherein it gels. Unlike Examples I and II, homogenizing is not necessary to attain the fat mimicking characteristics when the fat mimetic is cellulose based. If desired, 0.1% potassium sorbate can be added as a preservative after cooking, and 0% to 10% of a bulking agent such as cellulose, maltodextrin or polydextrose, and 0% to 2% dairy solids can be added prior to adding the microcrystalline cellulose solution.

A preferred formula which provides the improved texture and flavor for a fruit spread using a cellulose based fat mimetic, prepared as set forth above, comprising 35% fruit, fruit puree or fruit juice, 55% of a sweetener, 9.5% water, 0.2% of a stabilizer, 0.2% citric acid and 0.1% microcrystalline cellulose.

The final product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

EXAMPLE IV

A fruit spread having improved texture and flavor characteristics according to the invention is prepared using carrageenan as the fat mimetic. A fruit spread using this fat mimetic is prepared by blending 0% to 55% of a whole fruit, fruit puree or fruit juice flavoring with 10% to 75% of a sweetener such as sugar, corn syrup, or fruit juice concentrate and 0% to 80% of water at a low shear. The blend is then heated to between about 150° F. and 160° F. 1.0% to 3.0% of carrageenan is mixed with water to make a carrageenan solution which is then added to the heated blend. 0% to 10.0% by weight of cellulose powder, maltodextrin, or polydextrose is then added to the mixture as a bulking agent, and the final mixture is cooked in a vacuum kettle at about 160° F. to a desired soluble solids content between about 20% to 70%. The cooked mixture is hot filled into its final containers wherein it gels. If desired, 0.1% potassium sorbate can be added as a preservative after cooking. Optional ingredients for this fruit spread include 0% to 2% dairy solids and 0% to 5% added flavors which are added after cooking. As in Example III, homogenizing is not necessary to attain the fat mimicking characteristics when the fat mimetic is carrageenan based.

A preferred formula which produces the improved texture and flavor for a fruit spread using a carrageenan based fat mimetic, prepared as set forth above, comprises 35% fruit, fruit puree or fruit juice, 50% sugar, 11.5% water, 2% cellulose powder and 1.5% carrageenan.

The final product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

EXAMPLE V

A fruit spread having improved texture and flavor characteristics in accordance with the invention is prepared using a protein based fat mimetic and in particular a protein based fat mimetic product marketed by NutraSweet Company under the trademark Simplesse. A fruit spread using this protein based fat mimetic is prepared by blending, at a low shear, 0% to 55% of a whole fruit, fruit puree or fruit juice with 10% to 75% of a sweetener such as sugar, corn syrup or fruit juice concentrate and 0% to 80% of water, and heating the blend to a temperature between about 150° F. to 160° F. 0.1% to 2.0% of a stabilizer such as pectin, carrageenan, alginate, gellan gum, or other suitable hydrocolloid, is prepared with water to provide a pectin solution, and the latter and 2% to 20% of Simplesse are added to the heated blend. This mixture is then cooked in a vacuum kettle at a temperature of about 160° F. to a desired soluble solids content between about 20% to 70%. Following cooking, the mixture is cooled to about 130° F. to 140° F. and then filled into its final containers in which it gels. If desired, 0.1% by weight of potassium sorbate can be added as a preservative after cooking and before cooling of the mixture and 0% to 10% of a bulking agent such as cellulose, maltodextrin, or polydextrose, and 0% to 2% dairy solids can be added prior to the initial heating. It will be noted too, that homogenizing is not necessary to attain the fat mimicking characteristics when the fat mimetic is protein based.

A preferred formula which provides the improved texture and flavor for a fruit spread using a protein based fat mimetic, prepared as set forth above, comprises 35% fruit, fruit puree or fruit juice, 50% sugar, 9.4% water, 0.5% pectin and 5.0% Simplesse.

The final product produced in accordance with the foregoing example is a fruit spread having a creamy texture which facilitates the spreading thereof and which provides a good mouthfeel and a decreased dissipation rate in the mouth during consumption and thus an enhanced flavor relative to standard fruit spread products.

Although the present invention has been described with respect to various specific embodiments, various modifications will be apparent from the present disclosure and are intended to be within the scope of the following claims.

Having thus described the invention, it is claimed:

1. A fruit spread having improved texture and flavor comprising a microparticulated blend of up to about 55% by weight of a characterizing fruit ingredient selected from the group consisting of whole fruit, fruit puree and fruit juice, a sweetener in an amount to provide for the soluble solids content of the fruit spread to be between about 20% to 70% by weight, up to 80% by weight of water, and a fat mimetic.

2. The fruit spread according to claim 1, wherein said fat mimetic is selected from the group consisting of a low methoxyl pectin fat mimetic and a modified corn starch fat mimetic.

3. The fruit spread according to claim 2, wherein said fat mimetic is a low methoxyl pectin fat mimetic constituting at least about 0.5% by weight of said blend.

4. The fruit spread according to claim 3, wherein said low methoxyl based fat mimetic constitutes between about 0.5% and 3.0% of said blend.

5. The fruit spread according to claim 4, wherein said microparticulated blend has particles of between about 5 and 100 microns.

6. The fruit spread according to claim 1, wherein said fat mimetic is a modified corn starch fat mimetic constituting about 5% to 20% by weight of said blend.

7. The fruit spread according to claim 6, wherein said microparticulated blend has a particle aggregate size of between about 2 and 15 microns.

8. The fruit spread according to claim 2, wherein said microparticulated blend has a particle size of between about 2 and 100 microns.

9. The fruit spread according to claim 1, wherein said microparticulated blend has a particle aggregate size of between about 2 and 100 microns.

10. A method of preparing a fruit spread having improved texture and flavor comprising preparing a mixture of up to about 55% by weight of a characterizing fruit ingredient selected from the group consisting of whole fruit, fruit puree and fruit juice, up to about 80% by weight of water, a sweetener in an amount to provide a soluble solids content of from about 20% to 70%, and a fat mimetic, cooking said mixture to a desired solids content, and then homogenizing the cooked mixture under high shear to produce a microparticulated mixture.

11. The method according to claim 10, wherein said fat mimetic is a low methoxyl pectin fat mimetic consisting of about 0.5% to 3% by weight of said mixture.

12. The method according to claim 11, wherein said homogenizing particulates the cooked mixture into particles between about 5 and 100 microns.

13. The method according to claim 12, and adding calcium chloride to said mixture before adding said low methoxyl pectin fat mimetic thereto and in an amount to provide a total of less than 1% by weight of calcium ions in said total mixture.

14. The method according to claim 10, wherein said fat mimetic is a modified corn starch fat mimetic constituting about 5% to 20% by weight of the mixture, and homogenizing the cooked mixture.

15. The method according to claim 14, wherein said homogenizing particulates the cooked mixture into a particle gel with a particle aggregate size of between about 2 and 15 microns.

16. The method according to claim 15, and heating said mixture to a temperature of about 160° F. before cooking, and adding a stabilizer to said heated mixture.

* * * * *